United States Patent
Hughes et al.

(10) Patent No.: US 10,237,766 B2
(45) Date of Patent: Mar. 19, 2019

(54) ESTIMATION OF AVAILABLE USER DATA RATE IN A COMMUNICATIONS CHANNEL

(71) Applicant: RAYTHEON COMPANY, Waltham, MA (US)

(72) Inventors: Timothy J. Hughes, San Diego, CA (US); Deanna K. Harden, Fontana, CA (US)

(73) Assignee: RAYTHEON COMPANY, Waltham, MA (US)

( * ) Notice: Subject to any disclaimer, the term of this patent is extended or adjusted under 35 U.S.C. 154(b) by 598 days.

(21) Appl. No.: 14/483,215

(22) Filed: Sep. 11, 2014

(65) Prior Publication Data

US 2016/0323761 A1    Nov. 3, 2016

(51) Int. Cl.
*H04L 12/24* (2006.01)
*H04L 12/26* (2006.01)
*H04W 24/08* (2009.01)
*H04W 28/22* (2009.01)

(52) U.S. Cl.
CPC .......... *H04W 24/08* (2013.01); *H04L 41/147* (2013.01); *H04L 43/0894* (2013.01); *H04W 28/22* (2013.01)

(58) Field of Classification Search
CPC . H04W 24/08; H04W 72/1278; H04W 28/22; H04L 43/0894; H04L 43/0882; H02W 72/1257
See application file for complete search history.

(56) References Cited

U.S. PATENT DOCUMENTS

| | | | | |
|---|---|---|---|---|
| 7,801,153 B2* | 9/2010 | Anderson | ............... | H04L 45/00 370/395.4 |
| 7,965,671 B2* | 6/2011 | Anderson | ............... | H04L 45/00 370/322 |
| 2008/0205431 A1* | 8/2008 | Park | ...................... | H04W 74/04 370/458 |
| 2009/0010164 A1* | 1/2009 | Wang | ................ | H04W 72/0486 370/235 |
| 2009/0252102 A1* | 10/2009 | Seidel | ................... | H04W 84/18 370/329 |
| 2010/0039957 A1* | 2/2010 | Kotrla | ................. | H04L 41/5009 370/253 |
| 2010/0110922 A1* | 5/2010 | Ketheesan | .......... | H04L 43/0858 370/252 |
| 2012/0236726 A1* | 9/2012 | Shihada | .............. | H04L 43/0852 370/237 |

* cited by examiner

*Primary Examiner* — Jeffrey M Rutkowski
*Assistant Examiner* — Basil Ma
(74) *Attorney, Agent, or Firm* — Cantor Colburn LLP

(57) ABSTRACT

According to an aspect, a method for estimating available user data rate in a communications channel is provided. Node weight selection parameters are monitored by a resource manager executing on a node in communication with neighbor nodes. Neighbor node weight selection parameters are analyzed by the node. The node determines whether a change to a node weight or a neighbor node weight is needed to balance the available user data rate. The available user data rate is estimated for the node and the node weight is predictively adjusted as needed. The available user data rate is estimated for one or more of the neighbor nodes and an estimate of the neighbor node weight is generated as needed. A scheduler for the communications channel is updated based on the node weight and the estimate of the neighbor node weight.

18 Claims, 4 Drawing Sheets

ESTIMATION OF AVAILABLE USER DATA RATE IN A COMMUNICATIONS CHANNEL

STATEMENT OF GOVERNMENT INTEREST

This invention was made with government support under DARPA contract number MDA972-01-9-0022 awarded by the Department of Defense. The government has certain rights in the invention.

BACKGROUND

The present invention relates to communication systems, and more specifically, to estimation of available user data rate in a communications channel.

In communication systems, data transmitted between nodes of a communications channel include channel control information and user data. Users of the communications channel typically desire the highest available user data rate. Achieving a high data rate of error free communication is challenging, particularly where a number of nodes share the communications channel. Communication systems often employ error correction techniques to provide reliable communication. In one example, a lower channel burst rate is used with a larger signal-to-noise ratio margin and forward error correction (FEC) coding to increase communication reliability. Repeating of lost data can also be performed using an automatic repeat request (ARQ) or a hybrid automatic repeat request (HARM) that combines ARQ and FEC coding to minimize retransmission due to minor errors. However, these approaches may reduce overall user data rate by starting communications with a lower channel burst rate and adding communications channel overhead of FEC coding and ARQ/HARQ information.

SUMMARY

According to one embodiment of the present invention, a method for estimating an available user data rate in a communications channel is provided. The method includes monitoring a plurality of node weight selection parameters by a resource manager executing on a node in communication with a plurality of neighbor nodes of the communications channel. A plurality of neighbor node weight selection parameters is analyzed by the node. A check is performed for a change in the node weight selection parameters or the neighbor node weight selection parameters. The node determines whether a change to a node weight of the node or a change to a neighbor node weight of one or more of the neighbor nodes is needed to balance the available user data rate in the communications channel based on detecting the change in the node weight selection parameters or the neighbor node weight selection parameters. Based on determining that the change to the node weight is needed, the available user data rate is estimated for the node and the node weight is predictively adjusted to align with the available user data rate for the node. Based on determining that the change to the neighbor node weight is needed, the available user data rate is estimated for one or more of the neighbor nodes and an estimate of the neighbor node weight is generated to align with the available user data rate for one or more of the neighbor nodes. A scheduler for the communications channel is updated based on the node weight and the estimate of the neighbor node weight.

According to another embodiment of the present invention, a system is provided that includes a node operable to communicate with a plurality of neighbor nodes of a communications channel. The node includes a resource manager that includes instructions stored in memory that when executed cause processing circuitry of the node to monitor a plurality of node weight selection parameters of the node. A plurality of neighbor node weight selection parameters is analyzed by the node. A check is performed for a change in the node weight selection parameters or the neighbor node weight selection parameters. The node determines whether a change to a node weight of the node or a change to a neighbor node weight of one or more of the neighbor nodes is needed to balance the available user data rate in the communications channel based on detecting the change in the node weight selection parameters or the neighbor node weight selection parameters. Based on determining that the change to the node weight is needed, the available user data rate is estimated for the node and the node weight is predictively adjusted to align with the available user data rate for the node. Based on determining that the change to the neighbor node weight is needed, the available user data rate is estimated for one or more of the neighbor nodes and an estimate of the neighbor node weight is generated to align with the available user data rate for one or more of the neighbor nodes. A scheduler for the communications channel is updated based on the node weight and the estimate of the neighbor node weight.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
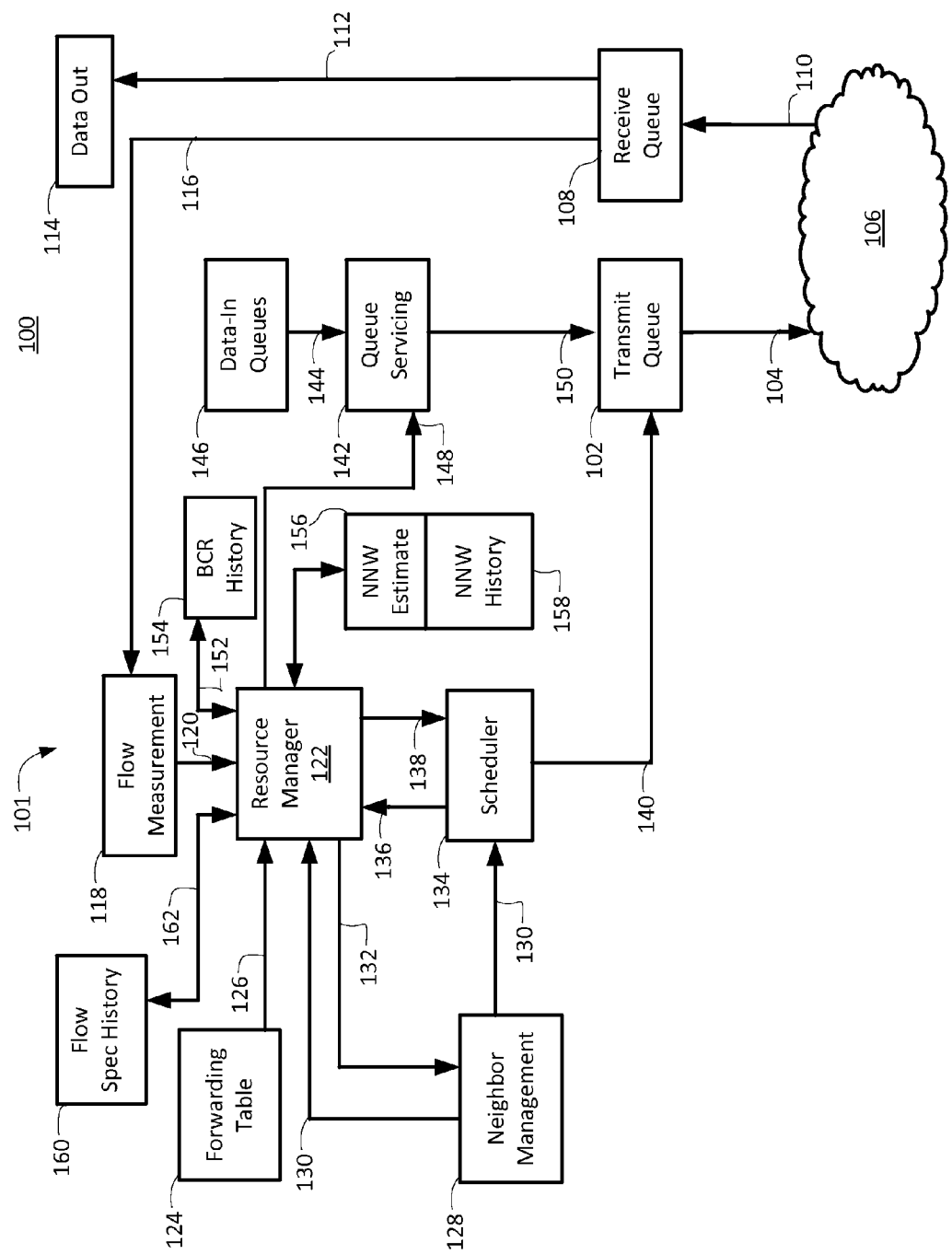
FIG. 1 illustrates a block diagram of a system according to an exemplary embodiment.

The embodiments described herein include systems and methods for providing estimation of available user data rate in a communications channel. Rather than focus on error correction techniques that reduce available user data rate, exemplary embodiments are directed to error prevention without data loss by predictive node weight adjustment. Embodiments enable communications starting from a higher channel burst rate as compared to error correction based communications channels. In one embodiment, a resource manager in each node determines a needed channel data rate based on past user data input specifications and a burst channel rate. The burst channel rate refers to a maximum supported data rate between nodes in a network and can change over time. Estimated weight values are determined to indicate data rate needs of the nodes in the network for the burst channel rate. Each of the nodes can utilize estimated weights of neighbor nodes to determine a best distribution burst channel rate to support the user data input specifications and/or quality-of-service (QoS) specifications.

Collision-free scheduling can be provided using time division multiple access (TDMA) communication. Alternatively, the estimated weights can be used to determine an ability of the nodes to contend for a contention access schema, such as carrier sense multiple access (CSMA) communication. In contention based schemas, when a node has data to send, it typically demands access to the communications channel without regard to QoS or total channel consumption. In non-contention schemas, such as TDMA, fixed allocations are typically programmed at configuration time or distributed based on a need to know. In one embodiment, access by the nodes to a communications channel is configured based on past known access needs and past channel rates. Once a rate of change of burst channel data and user data input rate are determined, measured data rate and transitions can be utilized to form predictions. Corrections to the rate of change information can be developed based on reports of actual measured data rates. The predictions can estimate weights and predictively adjust weights in the network rather than simply responding to a change in weighting need after the need arises. Changing needs can be monitored and data flows identified that exhibit a repeating periodic transmission sequence between the nodes to assist in developing patterns to predictively adjust weighting in the network.

In embodiments where network nodes exchange data rate needs with each other, rate change information can be directly determined. In alternate embodiments, each network node can monitor channel control information in messages to estimate communications channel utilization. Network routing information may also be periodically distributed in the network, and the nodes can use this information as well in developing a channel utilization estimate between nodes. As one example, in a contention-free channel access schema, information about data rate needs of nodes in a neighborhood or group of nodes may be available to capture. In a contention based channel access schema, a request/response protocol can be leveraged to provide insight into channel access needs of each node. Routing data may provide an indication of node-to-node paths to end destinations, which can be used to infer preferred node paths. Data being transmitted and the data rate utilized provide indications of likely receiver nodes, and utilization of available data payload space can provide an indication of the data in the transmission and the channel utilization. Additionally, analysis of the data in the transmission may provide an indication of the quality of service required by the nodes. Using this information, access needs of the nodes, channel utilization, and quality of service provisions in the channel can be estimated.

FIG. 1 illustrates a block diagram of a system 100 according to an exemplary embodiment. The system 100 includes a node 101 in a network configuration, where the node 101 may be implemented in a combination of one or more computer processors or processing circuitry, where one or more of the features described herein is tangibly embodied in a non-transitory computer readable storage medium (i.e., memory) as instructions executable by the one or more computer processors or processing circuitry. The system 100 can send and receive messages on a communications channel 106 to neighbor nodes in a network configuration, where nodes that are directly linked, i.e., one hop away, are considered neighbor nodes relative to the node 101. In an exemplary embodiment, the neighbor nodes in the communications channel 106 are also each an instance of the node 101. An example of neighbor nodes in a network configuration is further described herein in reference to FIGS. 3 and 4.

In the example of FIG. 1, the node 101 includes a transmit queue 102 operable to transmit a plurality of messages 104 to neighbor nodes in the communications channel 106 of the system 100. The node 101 also includes a receive queue 108 operable to receive a plurality of messages 110 from neighbor nodes in the communications channel 106. The messages 110 can be processed to unpack and separate data from control information and may also be decrypted or otherwise processed to account for one or more communication protocols used in transmitting the messages 110 to the node 101 in the system 100. Data 112 extracted from the messages 110 may be buffered at a data output buffer 114 for use by other processes in the node 101. Channel control information 116 and other statistics captured relating to the messages 110 can be passed to a flow measurement module 118. In one example, the flow measurement module 118 is a resource provided by an operating system (not depicted) of the node 101. The flow measurement module 118 can provide a flow specification 120 to a resource manager 122 of the node 101. The flow specification 120 can identify a number of flow parameters including a source, a destination, a code point, packets-per-second, bytes-per-second, and the like. A code point identifies a level of service, such as a differentiated service code point (DSCP), which is used to classify network traffic and quality of service. The packets-per-second and bytes-per-second can be further decomposed for differences between transmitter and receiver performance as needed.

The resource manager 122 can access a forwarding table 124 to determine next hop addresses 126 of neighbor nodes in the communications channel 106. A neighbor management module 128 may provide link capacity information 130 of neighbor nodes in the communications channel 106 to the resource manager 122. The link capacity information 130 can identify one-hop neighbor nodes in the communications channel 106 and identify average data rate modes per neighbor node to assist in determining node demands, e.g., mapping neighbor nodes to data rates. The resource manager 122 can provide control data measurements 132 back to the neighbor management module 128 to assist in determining an amount of available spectrum in the communications channel 106. The link capacity information 130 or a portion thereof can also be provided from the neighbor management module 128 to a scheduler 134.

The scheduler 134 can determine a node capacity and provide a current allocated rate 136 back to the resource manager 122. The current allocated rate 136 for the neighbor nodes in the communications channel 106 may be based on a combination of a number of time slots won for sending messages to particular nodes and an average data rate mode from the link capacity information 130. An average data rate mode may be a numerical code that aligns to a particular data rate and quality of service. The scheduler 134 can manage different sized time slots and track time slots won based on slot size and average data rate mode. For example, when attempting to schedule the messages 104, the scheduler 134 can use expected node weights for a next period 138 and average data rate modes per neighbor node to create a time slot utilization 140 that assigns different sized time slots, e.g., shorter, medium, longer, etc., and tracks scheduled time slots as time slots won. The time slots won in combination with the time slot sizes for the neighbor nodes in the communications channel 106 and average data rate modes per neighbor node are reflected in the current allocated rate 136. The time slot utilization 140 can be passed to the transmit queue 102 to determine when data should be sent in the messages 104 to particular neighbor nodes in the communications channel 106.

A queue servicing module 142 selectively extracts data 144 from data-in queues 146 based on a queue priority 148 from the resource manager 122 and passes data to transmit 150 to the transmit queue 102 to be sent in the messages 104 according to the time slot utilization 140. The data-in queues 146 can include a number of priority queues that reflect different qualities of service or a same quality of service. The resource manager 122 may provide the queue servicing module 142 with neighbor delivery information as part of the queue priority 148 to align with the data 144 from the data-in queues 146. Neighbor delivery information can include routing control and control codes, e.g., DSCP values, for addressing the data 144 to a desired neighbor node in the communications channel 106. The data to transmit 150 can be rate limited based on the current allocated rate 136 and may be encoded and/or encrypted prior to being sent from the transmit queue 102 in the messages 104.

The resource manager 122 can determine a burst channel rate 152 for links relative to each neighbor node in the communications channel 106. The burst channel rate 152 (or burst channel rates 152) may be determined based on the link capacity information 130 and/or observed performance of the communications channel 106. The burst channel rate 152 indicates a maximum supported data rate for transmissions relative to one neighbor node in the communications channel 106. Instances of the burst channel rate 152 may be stored in a burst channel rate history buffer 154 to track changes in the burst channel rate 152 over a period of time.

The resource manager 122 may initially determine an estimate of the neighbor node weight 156 based on an observed data rate from the flow specification 120 for the neighbor nodes, the burst channel rate 152, and a mapping of rates to node weights. A neighbor node weight history buffer 158 can store past values of the estimate of the neighbor node weight 156. New instances of the estimate of the neighbor node weight 156 can be determined by utilizing the neighbor node weight history buffer 158 and the burst channel rate history buffer 154. The estimate of the neighbor node weight 156 can be determined by comparing bandwidth needs across the communications channel 106 versus the burst channel rate 152 to establish a substantially balanced weighting between the neighbor nodes. When a change in characteristics is observed, such as a difference in the burst channel rate 152 as compared to a previous value in the burst channel rate history buffer 154, the estimate of the neighbor node weight 156 can be recalculated.

The resource manager 122 can monitor the flow specification 120 to determine metrics associated with observed data flows. For instance, the resource manager 122 can monitor the flow specification 120 to identify when a data flow to/from a neighbor node in the communications channel 106 starts and stops. The resource manager 122 can also monitor the flow specification 120 to determine inter-arrival timing of data flows. Summarized flow specification data 162 can be stored in the flow specification history buffer 160 to track and summarize data metrics from the flow specification 120, including observed data rates. In one embodiment, the resource manager 122 includes instructions stored in memory that when executed cause processing circuitry of the node 101 to perform a number of actions as described herein.

Figure 2:
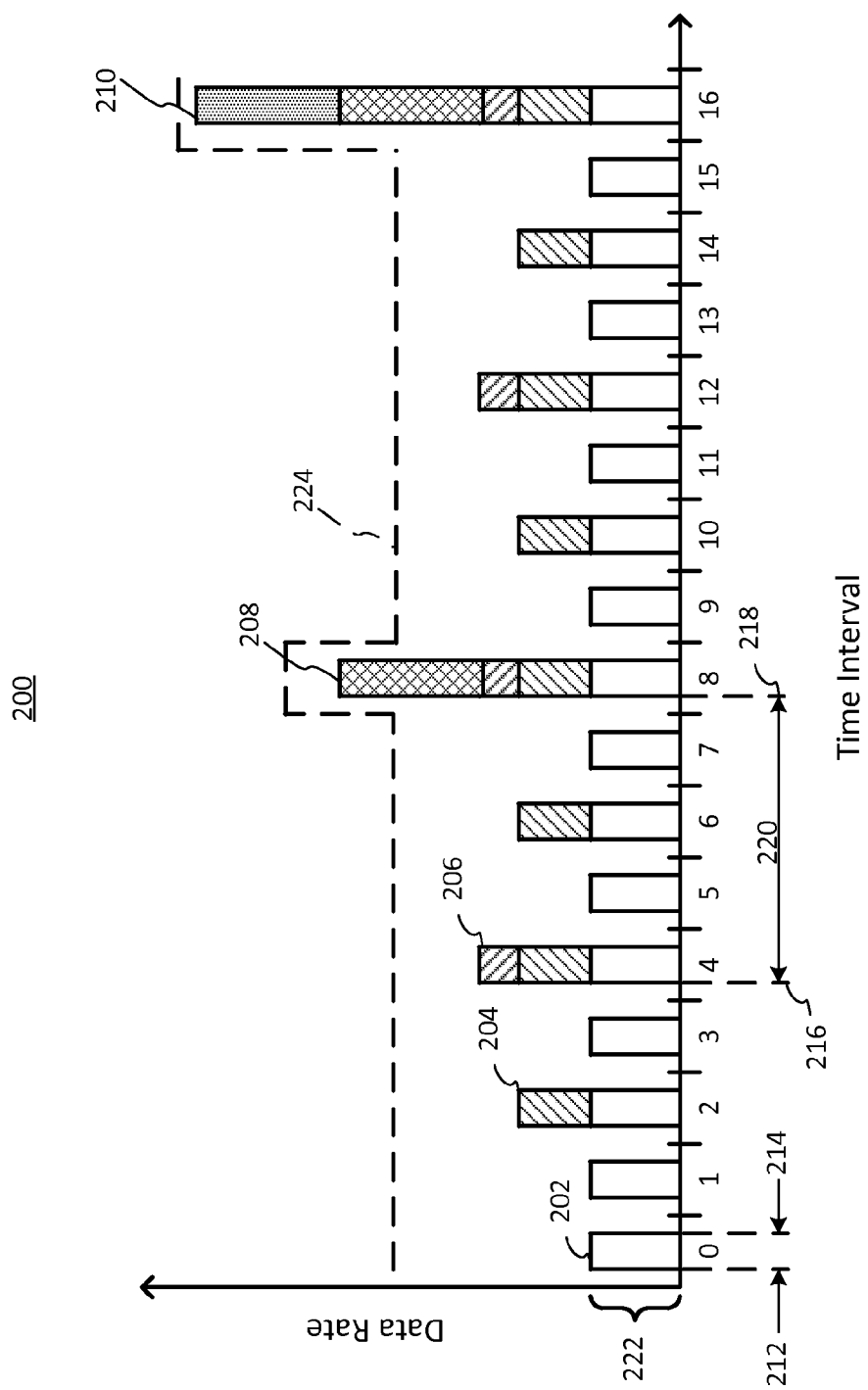
FIG. 2 illustrates an example of accumulated flow specification data over a period of time.

FIG. 2 illustrates an example of accumulated flow specification data over a period of time depicted as a histogram 200. The resource manager 122 of FIG. 1 can monitor the flow specification 120 of FIG. 1 to observe a data flow start time, stop time, inter-arrival timing, and data rate for each data flow. These values are depicted graphically in the example histogram 200 of FIG. 2, in relation to data flows 202, 204, 206, 208, and 210. For instance, data flow 202 has a start time 212, a stop time 214, and a periodicity of once per time interval in the example of FIG. 2. To measure inter-arrival time, a difference between an arrival time 216 and a next arrival time 218 is computed as inter-arrival time 220 for data flow 206 in FIG. 2, where the periodicity of data flow 206 can be defined as 1/inter-arrival time 220, or once every four time intervals after initial time interval 0. The height of the data flows 202, 204, 206, 208, and 210 in FIG. 2 represents an observed data rate 222 per data flow. The difference in the stop time 214 and start time 212 multiplied by the observed data rate 222 can establish a number of bits per data flow 202-210.

As previously described, the resource manager 122 of FIG. 1 can also observe the burst channel rate 152 of FIG. 1. As observations are performed over a period of time, the burst channel rate history buffer 154 of FIG. 1 is populated with historical values of the burst channel rate 152 of FIG. 1 while the flow specification history buffer 160 is populated with historical values of the flow specification 120 of FIG. 1. As time intervals occur where a greater number of the data flows 202-210 intersect, a larger instantaneous value of burst channel rate 152 of FIG. 1 is needed, which is depicted in FIG. 2 as a burst channel rate 224. For instance, in FIG. 2, it can be seen that during time interval 16 a much larger burst channel rate 224 is needed as compared to time interval 1. The resource manager 122 of FIG. 1 can observe and learn patterns to predict needs of the local node embodied as node 101 of FIG. 1 as well as predict neighbor node needs to make weighting adjustments predictively for adjustments to the scheduler 134 of FIG. 1.

Figure 4:
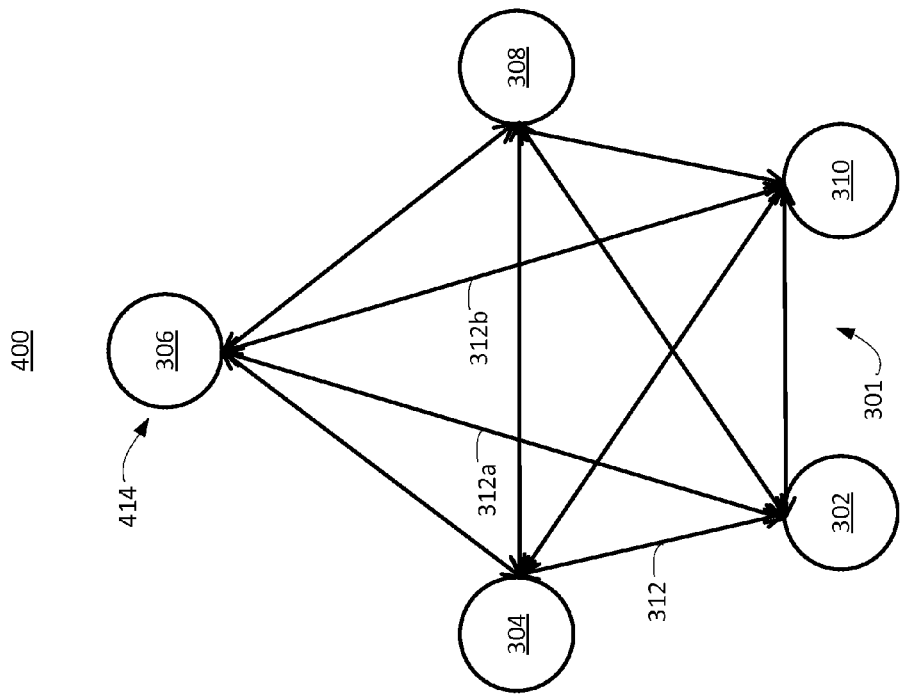
FIG. 4 illustrates an example of a modified network configuration for the group of neighboring nodes in FIG. 3.
Figure 3:
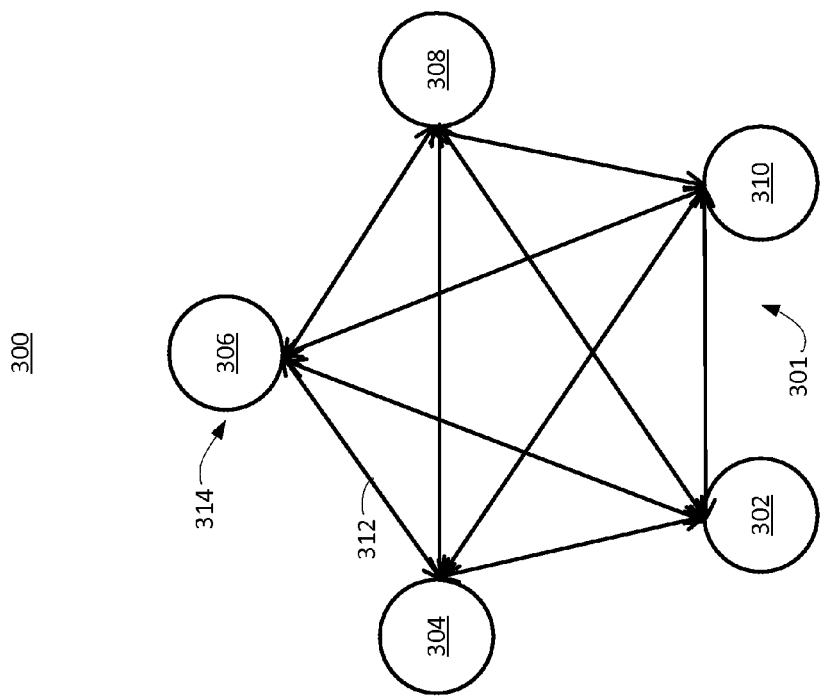
FIG. 3 illustrates an example network configuration for a group of neighboring nodes.

FIG. 3 illustrates an example network configuration 300 for a group of neighboring nodes in a communications channel 301. Nodes 302, 304, 306, 308, and 310 all include links 312 relative to one another. With respect to node 302, nodes 304-310 are neighbor nodes that are all one-hop away from each other, i.e., one-hop neighbor nodes. The communications channel 301 is one example of the communications channel 106 of FIG. 1, where each of the nodes 302-310 can include an instance of the node 101 of FIG. 1. FIG. 4 illustrates an example of a modified network configuration 400 for the group of neighboring nodes in the communications channel 301 of FIG. 3. In the network configuration 300 of FIG. 3, node 306 is at a first position 314 and shifts to position 414 in the modified network configuration 400 of FIG. 4. The shift from the first position 314 to the second position 414 may be due to mobility of node 306, where node 306 is a mobile device. The movement of node 306 may be reflected in a change in a burst channel rate supported by node 306 relative to nodes 302, 304, 308 and 310.

As one example, all of the links 312 of the network configuration 300 may have a same burst channel rate, a same traffic rate, and a same weight. For instance, the burst channel rate can be 10 Megabits per second (Mbps) for the communications channel 301, the traffic rate can be 1 Mbps per node, and the weight value can be 1. Movement of node 306 from the first position 314 to the second position 414 can result in lowering the burst channel rate to 5 Mbps for node 306, while the 10 Mbps rate is still supported by nodes 302, 304, 308, and 310. When considering the traffic data rate of all five nodes 302-310, a traffic rate of 1 Mbps multiplied by five nodes 302-310 results in a total need of 5 Mbps, and each of the nodes 302-310 requires $\frac{1}{10}$ of the 10 Mbps burst channel rate of the communications channel 301. With respect to the network configuration 300, each of the nodes 302-310 can have 2 Mbps of bandwidth allocated ($\frac{1}{5}*10$ Mbps), such that no weighting difference is needed and all of the weights can be set to 1. When the network configuration 300 shifts to the modified network configuration 400, the reduction of burst channel rate for node 306 can be accommodated through a change in weights or a reduction in the burst channel rate to nodes 302, 304, 308, and 310. In this example, since the sum of all traffic rates is 5 Mbps, lowering the burst channel rate to 5 Mbps fully accommodates all of the traffic demand. After the burst channel rate is lowered to 5 Mbps, the weights can be recalculated and remain unchanged since each node 302-310 requires $\frac{1}{5}$ of 5 Mbps. Any excess capacity can be shared fairly to balance the communications channel 301 even after the reduction in burst channel rate for all of the nodes 302-310.

In a second example with respect to FIGS. 3 and 4, the same initial conditions exist for the network configuration 300 of FIG. 3 as in the previous example, i.e., the burst channel rate is 10 Mbps for the communications channel 301, the traffic rate is 1 Mbps per node, and all nodes have a weight of 1. When the network configuration 300 shifts to the modified network configuration 400, only link 312$a$ between nodes 302 and 306 and link 312$b$ between nodes 310 and 306 are reduced to a burst channel rate of 5 Mbps, and all other links 312 maintain a burst channel rate of 10 Mbps. Since all links 312 from nodes 304 and 308 can still support the burst channel rate of 10 Mbps, nodes 304 and 308 are unchanged and nodes 302, 306, and 310 all transmit at 5 Mbps in the network configuration 400. Since $\frac{1}{5}=\frac{2}{10}$, the weights can be recalculated as 2 for nodes 302, 306, and 310, and as 1 for nodes 304 and 308. This results in a total of $\frac{2}{10}+\frac{2}{10}+\frac{2}{10}+\frac{1}{10}+\frac{1}{10}=\frac{8}{10}=\frac{4}{5}$. Each of the nodes 302-310 receives either $\frac{2}{5}*5$ Mbps+$\frac{1}{5}*1$ Mbps or $\frac{1}{5}*10$ Mbps+$\frac{1}{5}*2$ Mbps of the communications channel 301. Any excess capacity can be shared fairly to balance the communications channel 301 for all of the nodes 302-310. As will be appreciated, additional nodes could join the modified network configuration 400 or be removed, e.g., a mobile device powers on or powers down. Furthermore, the modified network configuration 400 may include additional neighbor nodes such that multiple hops are needed to traverse the communications channel 301. As a further possibility, one or more of the links 312 may fail or be altered, and the weights and parameters of the modified network configuration 400 can be adjusted accordingly upon detecting a change.

Figure 5:
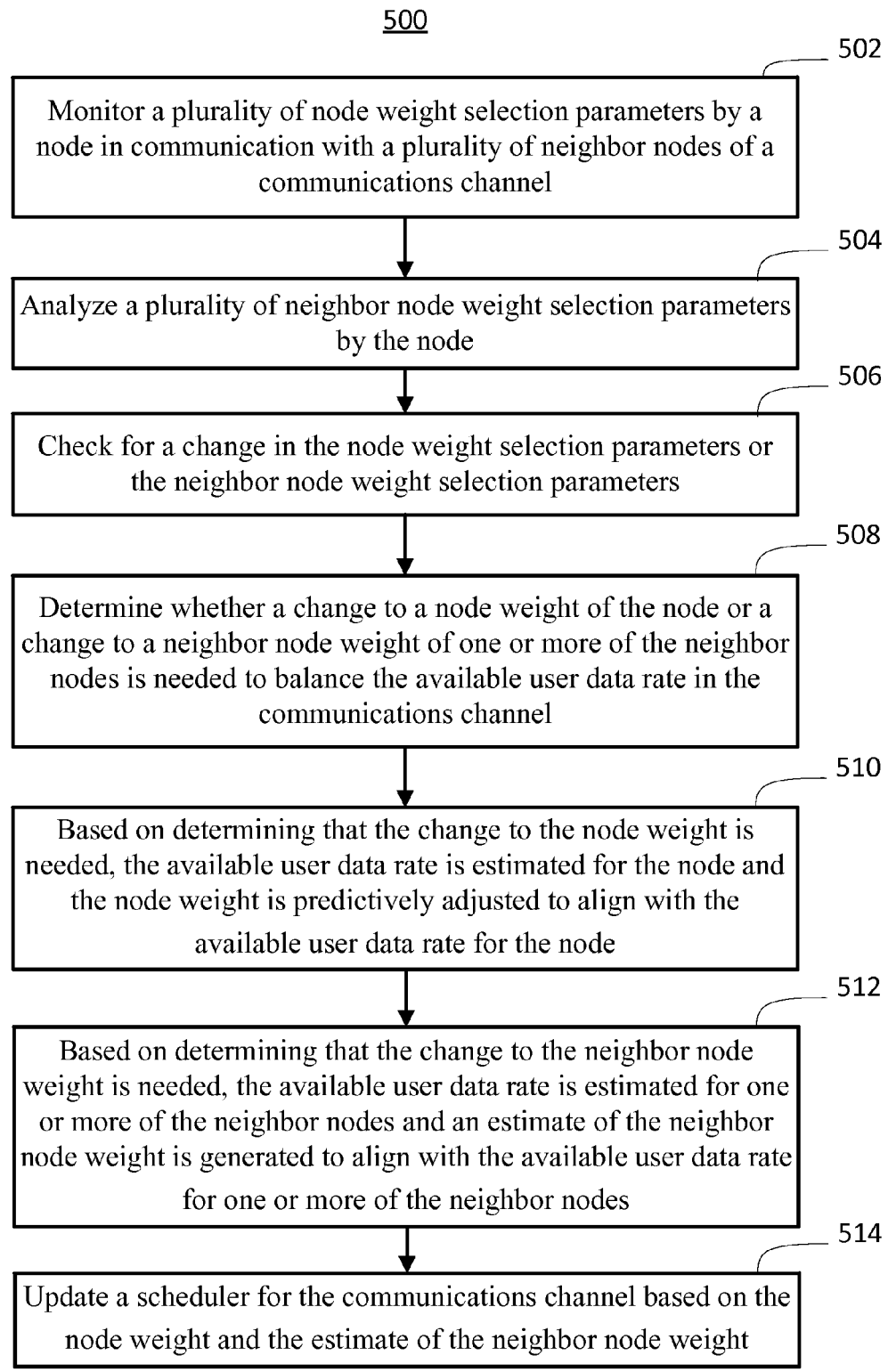
FIG. 5 illustrates an exemplary process for estimating available user data rate in a communications channel.

FIG. 5 illustrates an exemplary process 500 for estimating available user data rate in a communications channel. The process 500 can be implemented in the system 100 of FIG. 1. The process 500 is described in reference to FIGS. 1-5 and may be done in an alternate ordering than depicted and described herein.

At block 502, node weight selection parameters are monitored by a resource manager executing on node in communication with a plurality of neighbor nodes of a communications channel. For example, with respect to node 302 of FIGS. 3 and 4 various parameters that impact node weight selection relative to neighbor nodes 304-310 of FIGS. 3 and 4 can be monitored by the resource manager 122 of FIG. 1 executing on node 302. Monitoring node weight selection parameters may include monitoring the flow specification 120 of FIG. 1, defining data rates and sizes for a plurality of data flows in the communications channel 106, 301. The monitoring can also include monitoring of data rate modes and burst channel rates of links 312 between the node 302 and one or more of the neighbor nodes 304-310 in the communications channel. The monitoring can further include monitoring for a routing change in the forwarding table 124 of FIG. 1 that defines next hop addresses for the data flows.

At block 504, neighbor node weight selection parameters are analyzed by the node 302. Analyzing the neighbor node weight selection parameters can include monitoring traffic of the communications channel 106, 301 associated with the neighbor nodes 304-310 and determining a data rate mode for each of the neighbor nodes 304-310.

At block 506, a check is performed for a change in the node weight selection parameters or the neighbor node weight selection parameters. At block 508, the node 302 determines whether a change to a node weight of the node 302 or a change to a neighbor node weight of one or more of the neighbor nodes 304-310 is needed to balance the available user data rate in the communications channel 106, 301 based on detecting the change in the node weight selection parameters or the neighbor node weight selection parameters.

At block 510, based on determining that the change to the node weight is needed, the available user data rate is estimated for the node 302 and the node weight is predictively adjusted to align with the available user data rate for the node 302. At block 512, based on determining that the change to the neighbor node weight is needed, the available user data rate is estimated for one or more of the neighbor nodes 304-310 and an estimate of the neighbor node weight is generated to align with the available user data rate for one or more of the neighbor nodes 304-310. At block 514, the scheduler 134 of FIG. 1 is updated for the communications channel 106, 301 based on the node weight and the estimate of the neighbor node weight.

Embodiments may identify a data flow start, a data flow stop, and an observed data rate from the flow specification 120 of FIG. 1 for each of the data flows. An inter-arrival timing can be determined between updates of the flow specification 120. A pattern of repetition of the data flows may be determined based on the data flow start, the data flow stop, the observed data rate, and the inter-arrival timing, such as start time 212, stop time 214, observed data rate 222, and inter-arrival time 220 for data flows 202-210 of FIG. 1. Predicted flow specification can be generated for the data flows based on the pattern of repetition of the data flows. Data can be extracted and summarized from the flow specification 120 of FIG. 1 as summarized flow specification data 162 and stored in a flow specification history buffer 160 of FIG. 1. The flow specification history buffer 160 of FIG. 1 may be utilized to determine one or more changes to the node weight selection parameters. A required data rate can be determined to satisfy the predicted flow specification. The required data rate may be mapped to a node weight definition that meets or exceeds the required data rate. The node weight can be predictively adjusted based on the mapping.

An initial value of the estimate of the neighbor node weight 156 of FIG. 1 can be determined based on the observed data rate from the flow specification 120 of FIG. 1 for one or more of the neighbor nodes 304-310 of FIG. 3, the burst channel rates 152, and a mapping of rates to node weights. Past values of the estimate of the neighbor node weight 156 of FIG. 1 may be stored in a neighbor node weight history buffer 158 of FIG. 1. Past values of the burst channel rates 152 of FIG. 1 can be stored in a burst channel rate history buffer 154 of FIG. 1. The neighbor node weight history buffer 158 and the burst channel rate history buffer 154 of FIG. 1 may be utilized to determine one or more changes to the neighbor node weight selection parameters.

Link capacity information 130 of FIG. 1 can be received by the resource manager 122 of FIG. 1 to identify an average data rate mode for the neighbor nodes 304-310 of FIG. 3. Demands of the neighbor nodes 304-310 may be determined based on the average data rate mode for the neighbor nodes 304-310 of FIG. 3. The available user data rate in the communications channel 106, 301 may be balanced in view of the demands of the neighbor nodes 304-310 of FIG. 3 to predictively adjust the node weight. A current allocated rate for the neighbor nodes 304-310 of FIG. 3 may be determined in the communications channel 106, 301 based on a combination of a number of time slots won in the scheduler 134 of FIG. 1 for sending messages 104 of FIG. 1 and the average data rate mode for the neighbor nodes 304-310 of FIG. 3. The available user data rate in the communications channel 106, 301 can be balanced in view of the current allocated rate 136 of FIG. 1 for the neighbor nodes 304-310 of FIG. 3.

The technical effects and benefits of the embodiments described herein provide estimation of available user data rate in a communications channel. The estimation can involve predictively adjusting a node weight to align with an available user data rate for a node. Rather than merely reacting to changes after they occur, embodiments can predict flow specification for data flows based on a determined pattern of repetition of the data flows. Neighbor node weight estimates can also be determined to balance the available user data rate in the communications channel in view of the demands and/or currently allocated rates of the neighbor nodes.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for estimating an available user data rate in a communications channel, the method comprising:

monitoring a plurality of node weight selection parameters by a resource manager executing on a node in communication with a plurality of neighbor nodes of the communications channel including monitoring a flow specification defining data rates and sizes for a plurality of data flows in the communications channel;

generating a predicted flow specification for the data flows based on a pattern of repetition of the data flows including determining a rate of change of burst channel data rate and user data input rate, wherein the burst channel data rate comprises a maximum supported data rate that changes over time for transmissions relative to one or more of the neighbor nodes as a local maximum determined over a shorter time interval relative to a longer observation period that extends to observe a periodicity of the pattern of repetition of the data flows;

determining a required data rate to satisfy the predicted flow specification;

mapping the required data rate to a node weight definition that meets or exceeds the required data rate;

analyzing a plurality of neighbor node weight selection parameters by the node;

checking for a change in the node weight selection parameters or the neighbor node weight selection parameters;

determining, by the node, whether a change to a node weight of the node or a change to a neighbor node weight of one or more of the neighbor nodes is needed to balance the available user data rate in the communications channel based on detecting the change in the node weight selection parameters or the neighbor node weight selection parameters;

based on determining that the change to the node weight is needed, estimating the available user data rate for the node and predictively adjusting the node weight based on the mapping to align with the available user data rate for the node;

based on determining that the change to the neighbor node weight is needed, estimating the available user data rate for one or more of the neighbor nodes and generating an estimate of the neighbor node weight to align with the available user data rate for one or more of the neighbor nodes; and updating a scheduler for the communications channel based on the node weight and the estimate of the neighbor node weight.

2. The method of claim 1, wherein monitoring the node weight selection parameters comprises:

monitoring data rate modes and burst channel rates of links between the node and one or more of the neighbor nodes in the communications channel; and monitoring for a routing change in a forwarding table that defines next hop addresses for the data flows.

3. The method of claim 1, wherein analyzing the neighbor node weight selection parameters further comprises:
monitoring traffic of the communications channel associated with the neighbor nodes; and
determining a data rate mode for each of the neighbor nodes.

4. The method of claim 2, further comprising:
identifying a data flow start, a data flow stop, and an observed data rate from the flow specification for each of the data flows;
determining an inter-arrival timing between updates of the flow specification; and
determining the pattern of repetition of the data flows based on the data flow start, the data flow stop, the observed data rate, and the inter-arrival timing.

5. The method of claim 4, further comprising:
determining an initial value of the estimate of the neighbor node weight based on the observed data rate from the flow specification for one or more of the neighbor nodes, the burst channel rates, and a mapping of rates to node weights.

6. The method of claim 5, further comprising:
storing past values of the estimate of the neighbor node weight in a neighbor node weight history buffer;
storing past values of the burst channel rates in a burst channel rate history buffer; and
utilizing the neighbor node weight history buffer and the burst channel rate history buffer to determine one or more changes to the neighbor node weight selection parameters.

7. The method of claim 4, further comprising:
summarizing the flow specification as summarized flow specification data;
storing the summarized flow specification data in a flow specification history buffer; and
utilizing the flow specification history buffer to determine one or more changes to the node weight selection parameters.

8. The method of claim 1, further comprising:
receiving link capacity information to identify an average data rate mode for the neighbor nodes;
determining demands of the neighbor nodes based on the average data rate mode for the neighbor nodes; and
balancing the available user data rate in the communications channel in view of the demands of the neighbor nodes to predictively adjust the node weight.

9. The method of claim 8, further comprising:
determining a current allocated rate for the neighbor nodes in the communications channel based on a combination of a number of time slots won in the scheduler for sending messages and the average data rate mode for the neighbor nodes; and
balancing the available user data rate in the communications channel in view of the current allocated rate for the neighbor nodes.

10. A system comprising a node operable to communicate with a plurality of neighbor nodes of a communications channel, the node comprising:
a resource manager comprising instructions stored in memory that when executed cause processing circuitry of the node to:
monitor a plurality of node weight selection parameters of the node including monitoring a flow specification defining data rates and sizes for a plurality of data flows in the communications channel;
generate a predicted flow specification for the data flows based on a pattern of repetition of the data flows including determining a rate of change of burst channel data rate and user data input rate, wherein the burst channel data rate comprises a maximum supported data rate that changes over time for transmissions relative to one or more of the neighbor nodes as a local maximum determined over a shorter time interval relative to a longer observation period that extends to observe a periodicity of the pattern of repetition of the data flows;
determine a required data rate to satisfy the predicted flow specification;
map the required data rate to a node weight definition that meets or exceeds the required data rate;
analyze a plurality of neighbor node weight selection parameters by the node;
check for a change in the node weight selection parameters or the neighbor node weight selection parameters;
determine whether a change to a node weight of the node or a change to a neighbor node weight of one or more of the neighbor nodes is needed to balance the available user data rate in the communications channel based on detecting the change in the node weight selection parameters or the neighbor node weight selection parameters;
based on determining that the change to the node weight is needed, estimate the available user data rate for the node and predictively adjust the node weight based on the mapping to align with the available user data rate for the node; and
based on determining that the change to the neighbor node weight is needed, estimate the available user data rate for one or more of the neighbor nodes and generate an estimate of the neighbor node weight to align with the available user data rate for one or more of the neighbor nodes; and
a scheduler for the communications channel that is updated based on the node weight and the estimate of the neighbor node weight.

11. The system of claim 10, wherein monitoring the node weight selection parameters further comprises instructions stored in the memory that when executed cause the processing circuitry of the node to:
monitor data rate modes and burst channel rates of links between the node and one or more of the neighbor nodes in the communications channel; and
monitor for a routing change in a forwarding table that defines next hop addresses for the data flows.

12. The system of claim 10, wherein analyzing the neighbor node weight selection parameters further comprises instructions stored in the memory that when executed cause the processing circuitry of the node to:
monitor traffic of the communications channel associated with the neighbor nodes; and
determine a data rate mode for each of the neighbor nodes.

13. The system of claim 11, wherein the instructions stored in the memory that when executed cause the processing circuitry of the node to:
identify a data flow start, a data flow stop, and an observed data rate from the flow specification for each of the data flows;
determine an inter-arrival timing between updates of the flow specification; and
determine the pattern of repetition of the data flows based on the data flow start, the data flow stop, the observed data rate, and the inter-arrival timing.

14. The system of claim 13, wherein the instructions stored in the memory that when executed cause the processing circuitry of the node to determine an initial value of the estimate of the neighbor node weight based on the observed data rate from the flow specification for one or more of the neighbor nodes, the burst channel rates, and a mapping of rates to node weights.

15. The system of claim 14, wherein the instructions stored in the memory that when executed cause the processing circuitry of the node to:
store past values of the estimate of the neighbor node weight in a neighbor node weight history buffer;
store past values of the burst channel rates in a burst channel rate history buffer; and
utilize the neighbor node weight history buffer and the burst channel rate history buffer to determine one or more changes to the neighbor node weight selection parameters.

16. The system of claim 13, wherein the instructions stored in the memory that when executed cause the processing circuitry of the node to:
summarize the flow specification as summarized flow specification data;
store the summarized flow specification data in a flow specification history buffer; and
utilize the flow specification history buffer to determine one or more changes to the node weight selection parameters.

17. The system of claim 10, wherein the instructions stored in the memory that when executed cause the processing circuitry of the node to:
receive link capacity information to identify an average data rate mode for the neighbor nodes;
determine demands of the neighbor nodes based on the average data rate mode for the neighbor nodes; and
balance the available user data rate in the communications channel in view of the demands of the neighbor nodes to predictively adjust the node weight.

18. The system of claim 17, wherein the instructions stored in the memory that when executed cause the processing circuitry of the node to:
determine a current allocated rate for the neighbor nodes in the communications channel based on a combination of a number of time slots won in the scheduler for sending messages and the average data rate mode for the neighbor nodes; and
balance the available user data rate in the communications channel in view of the current allocated rate for the neighbor nodes.

* * * * *